US008711380B2

(12) United States Patent
Burry et al.

(10) Patent No.: US 8,711,380 B2
(45) Date of Patent: Apr. 29, 2014

(54) AUTOMATIC IMAGE-CONTENT BASED ADJUSTMENT OF PRINTER PRINTING PROCEDURES

(75) Inventors: Aaron Michael Burry, West Henrietta, NY (US); Eric Scott Hamby, Fairport, NY (US); Christopher Auguste DiRubio, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 1650 days.

(21) Appl. No.: 11/554,093

(22) Filed: Oct. 30, 2006

(65) Prior Publication Data

US 2008/0144067 A1    Jun. 19, 2008

(51) Int. Cl.
*G06F 3/12* (2006.01)
*G06K 15/00* (2006.01)
*H04N 1/40* (2006.01)
*G03G 15/00* (2006.01)
*G03G 15/22* (2006.01)

(52) U.S. Cl.
USPC ........ 358/1.14; 358/1.13; 358/3.01; 358/3.06; 358/3.21; 358/3.23; 358/3.24; 399/11; 399/38; 399/130

(58) Field of Classification Search
USPC ............... 358/1.9, 2.1, 3.01, 3.05, 3.06, 3.23, 358/3.22, 3.21, 1.13, 1.14, 1.18, 504, 503, 358/515, 521, 3.24; 347/112, 114, 171, 347/179, 180, 183, 185, 188; 399/1, 11, 15, 399/16, 27, 28, 33, 34, 39, 43, 46, 49, 53, 399/67, 70, 71, 72, 73, 74, 128, 129, 149, 399/222, 343, 38, 130
See application file for complete search history.

(56) References Cited

U.S. PATENT DOCUMENTS

| | | | |
|---|---|---|---|
| 5,463,455 A | 10/1995 | Pozniakas et al. | |
| 5,488,458 A | 1/1996 | Benedict et al. | |
| 5,767,978 A * | 6/1998 | Revankar et al. | 358/296 |
| 6,048,117 A | 4/2000 | Banton | |
| 6,121,986 A * | 9/2000 | Regelsberger et al. | 347/151 |
| 6,160,971 A | 12/2000 | Scheuer et al. | |
| 6,324,353 B1 | 11/2001 | Laussermair et al. | |
| 6,559,874 B2 * | 5/2003 | Tanaka et al. | 347/115 |
| 6,639,669 B2 | 10/2003 | Hubble, III et al. | |
| 6,684,035 B2 | 1/2004 | Furno et al. | |
| 6,883,892 B2 | 4/2005 | Sievert et al. | |
| 6,909,858 B2 * | 6/2005 | Hama et al. | 399/49 |
| 6,972,867 B1 | 12/2005 | Venable et al. | |
| 6,987,025 B1 | 1/2006 | Azpiroz et al. | |
| 7,426,352 B2 * | 9/2008 | Moriyama et al. | 399/43 |
| 7,539,427 B2 * | 5/2009 | Slattery et al. | 399/44 |
| 7,593,130 B2 * | 9/2009 | Mongeon et al. | 358/1.4 |
| 7,602,529 B2 * | 10/2009 | Foster et al. | 358/2.1 |
| 7,605,931 B2 * | 10/2009 | Sato et al. | 358/1.14 |
| 7,660,000 B2 * | 2/2010 | Ota | 358/1.13 |
| 2003/0123901 A1 * | 7/2003 | Wagner et al. | 399/128 |
| 2004/0197110 A1 * | 10/2004 | Bessho et al. | 399/27 |
| 2004/0207862 A1 * | 10/2004 | Such et al. | 358/1.9 |

(Continued)

*Primary Examiner* — Firmin Backer
*Assistant Examiner* — Jonathan Beckley
(74) *Attorney, Agent, or Firm* — Fox Rothschild LLP

(57) ABSTRACT

The disclosure proposes the automatic use of the job or image content information of a print job. This information is used to automatically adjust the general printing procedure for a print engine. The job's image content information is analyzed in the context of the constraints of the print engine to determine an improved printing procedure, which may include cycle-up operation, process control cycles, or maintenance cycles for that particular print job.

20 Claims, 4 Drawing Sheets

(56) References Cited

U.S. PATENT DOCUMENTS

| | | |
|---|---|---|
| 2005/0089340 A1* | 4/2005 | Yamamoto ................... 399/49 |
| 2005/0244172 A1* | 11/2005 | Kreckel ..................... 399/27 |
| 2006/0055970 A1* | 3/2006 | Smith et al. ................ 358/1.16 |
| 2006/0067757 A1 | 3/2006 | Anderson et al. |
| 2006/0082823 A1* | 4/2006 | Ahn ......................... 358/1.15 |
| 2006/0114287 A1 | 6/2006 | Burry et al. |
| 2007/0216930 A1* | 9/2007 | Jacobs et al. ............... 358/1.14 |

\* cited by examiner

AUTOMATIC IMAGE-CONTENT BASED ADJUSTMENT OF PRINTER PRINTING PROCEDURES

CROSS-REFERENCE TO RELATED APPLICATIONS

Not Applicable

STATEMENT REGARDING FEDERALLY SPONSORED RESEARCH

Not Applicable

THE NAMES OF THE PARTIES TO A JOINT RESEARCH AGREEMENT

Not Applicable

INCORPORATION-BY-REFERENCE OF MATERIAL ON DISC

Not Applicable

BACKGROUND

1. Technical Field

The disclosure contained herein generally relates to a method for monitoring image content and adjusting the interval or frequency of process control sampling and maintenance cycles correspondingly.

2. Description of Related Art

The electrophotographic print process has become widely used due to its capability for high print performance, high print quality and low page costs. Much effort has been made to further improve the process, especially in relation to increased printing speed and decreased printing costs. Issues related to print speed and costs may be affected by the physical mechanisms behind the process. Although the following discussion will be made in relation to the xerographic process, other processes are envisioned, such as laser printing, LED printing, ink jet printing, phase-charge or solid ink printing, dye sublimation printing, or thermal printing.

Xerography, also called electrophotography, is a method of dry photocopying in which the image is transferred by use of the attractive forces of electric charges. A beam of light, such as from a laser or a linear array of photodiodes, is made to strike the original material, e.g., a white page with black or color lettering or images. Light rays are reflected off the white areas onto a photosensitive plate over which electric charges have been spread often referred to as the photoreceptor. The charge collected by each photodiode or by the laser is proportional to the reflectance of each area of the paper. A reflectance map of the image on the paper may be built up in a single sweep. Color images can be captured by exposing the image with colored light or by using colored filters in the linear array. Charges are neutralized from the areas struck by the rays. Since no light rays are reflected from black lettering for example, charges are retained on the plate in areas corresponding to the lettered areas of the original. A printing material referred to as toner is introduced that sticks to the charged areas. A sheet of paper is then passed between the plate and another charged object that draws the toner from the plate to the paper, forming an image of the original. The toner is then fused to the paper with heat.

Many of the components of a xerographic print engine may need periodic maintenance or calibration procedures to maintain high quality print output. Print engines, which as used herein may include xerographic, inkjet, or other devices that print text and graphics on a document, make use of process control cycles to sample the particular internal states and/or outputs of the system and to make the appropriate updates to system actuators to maintain a consistent level of output print performance. In addition to process control cycles, many print engines require a particular set of actions to be taken during the transition from the standby or ready state to the printing state ("cycle-up"). These cycle-up activities could actually include running process control cycles as well as other maintenance cycles. Print engines might require maintenance cycles to be performed at regular intervals during a user's print job in order to continue printing with the highest level of output print quality. These maintenance cycles may also be required when a sensor reading drifts out of specification limits. In a general context, the rules or the algorithms that describe these required actions and their occurrence are referred to as the "printer operations" or "printing procedure" for the printing engine.

From a user perspective, the cycles spent in running process control, cycle-up, or maintenance cycles are, in fact, wasted cycles. Here, "wasted" refers to the fact that no user output pages are being produced during these cycles. Thus, these cycles contribute to the run cost of the print engine through abuse of components, waste of toner, and other print related expenses, but do not produce any useable output for the user.

In the past, the update period for the process control sampling has typically been fixed at design time. Likewise, the set of activities that is required during the cycle-up routine is either fixed at design time or may be set to vary based on the state of the machine or specific environmental factors. Maintenance cycles have traditionally been performed based on a fixed interval between cycles or based on feedback from a sensor in the machine. Thus, in the past there has not typically been a provision for modifying the printing procedure based on the image or job content of the user's submitted print jobs in an effort to improve system run cost. Currently, some machines do provide a provision for a "draft" mode and/or an "enhanced" mode of operation. However, these are user input preferences that are used to determine the required operational mode for the print engine. These strategies do not take into account within-job or job-to-job image content variations as part of the construction of the printing procedure.

Accordingly, what is needed is a method to monitor image content and adjust the interval or frequency of process control sampling and maintenance cycles correspondingly. More specifically, there is a need for a method to reduce the run cost per page for a printing engine based on the print job image content.

The disclosure contained herein describes solutions to one or more of the problems described above.

SUMMARY

Embodiments of the current disclosure address the need for a method to monitor image content and adjust the interval or frequency of process control sampling and maintenance cycles correspondingly. In an embodiment, a method of operating a print engine comprising receiving a print job in a print queue, analyzing image content of the print job, determining a printing procedure for a print engine based on the image content of the print job, and performing a maintenance event, process control cycle, or other operation in the print engine based on the determined printing procedure is provided.

In a further embodiment, a second print job may be received in the print queue. The second print job may be received at the print queue while the first job is also in the print queue or is being printed. This second print job will be analyzed for image content, and a modified printing procedure will be determined for the print engine based on the combined image content information of the first and second print jobs. A maintenance event, process control cycle, or other operation may then be performed based on the modified printing procedure.

In yet another embodiment, the method of operating a print engine may further comprise analyzing results of a process control cycle and adjusting print engine actuators to maintain consistent print job quality. Additionally, a new process control cycle interval may be set based on the print quality.

In a further embodiment, a print job may include multiple documents, each of which may include different image content. A single print job which is a single file or document may also include varying image content. Analyzing the image content may be determining an overall color content, mean area coverage for each color separation, maximum size of mid-level halftone blocks for each color separation, or maximum area coverage for each color separation for any given page of the print job. Analyzing the image content may also comprise analyzing a spatial content of the print job, wherein the spatial content may indicate susceptibility to halftone depletion surrounding text, reload defects, or ghosting.

In a further embodiment, a printing procedure for a print engine may include determining a cycle-up procedure, determining a process control sampling interval or determining a required maintenance cycle interval. Determining a maintenance cycle interval may include decreasing the frequency of a color calibration cycle interval if the overall color content of the print job is below a threshold value, or increasing a cleaning cycle interval for the charging device of the print engine if the mid-level halftone content of the print job is below a threshold value. Determining a maintenance cycle interval may further include decreasing a lubrication cycle interval for a cleaning device of the print engine, wherein lubrication stripes are printed to provide toner lubrication to a cleaning blade if the overall mean area coverage of the print job is below a threshold value.

In a further embodiment, a printing procedure for a print engine may include determining a cycle-up procedure, wherein the cycle-up procedure may comprise not performing a process control cycle during cycle-up of the print engine if mean area coverage per page for all color separations of the print job is below a threshold value. Determining a cycle-up procedure may further comprise not performing a process control cycle during the cycle-up of a print engine if the total length of the print job is below a threshold value, or not performing the process control cycle during the cycle-up procedure if the largest block of mid-level halftone region for all color separations of the print job is below a threshold value.

In a further embodiment, a printing procedure for a print engine nay include determining a process control cycle which may comprise increasing an interval for measurement of test patches and adjustment of the exposure device of a color separation of the print engine if the total area coverage for the color separation of the print job is below a threshold value.

A further embodiment of the current disclosure may include a method of operating a print engine comprising receiving more than one print job in a print queue. Image content for a first print job in a print queue may be analyzed, wherein analyzing the image content includes determining overall color content, mean area coverage for each color separation, maximum size of mid-level halftone blocks for each color separation, or maximum area coverage for each color separation for any given page of the print job. Analyzing the image content may also comprise analyzing a spatial content of the print job, wherein the spatial content may indicate susceptibility to halftone depletion surrounding text, reload defects, or ghosting. A printing procedure for a print engine based on the image content of the first print job in the print queue may then be determined. The printing procedure for the print engine also includes determining a cycle-up procedure, determining a process control sampling interval or determining a maintenance cycle interval. A second print job may be received in the queue, and image content for this second print job may be analyzed. The printing procedure for the print engine will then be modified based on the image content of the second print job. A maintenance event, process control cycle or other event may then be performed in the print engine based on the modified printing procedure.

BRIEF DESCRIPTION OF THE SEVERAL VIEWS OF THE DRAWINGS

Aspects, features, benefits and advantages of the embodiments described herein will be apparent with regard to the following description, appended claims and accompanying drawings where:

DETAILED DESCRIPTION

Figure 1:
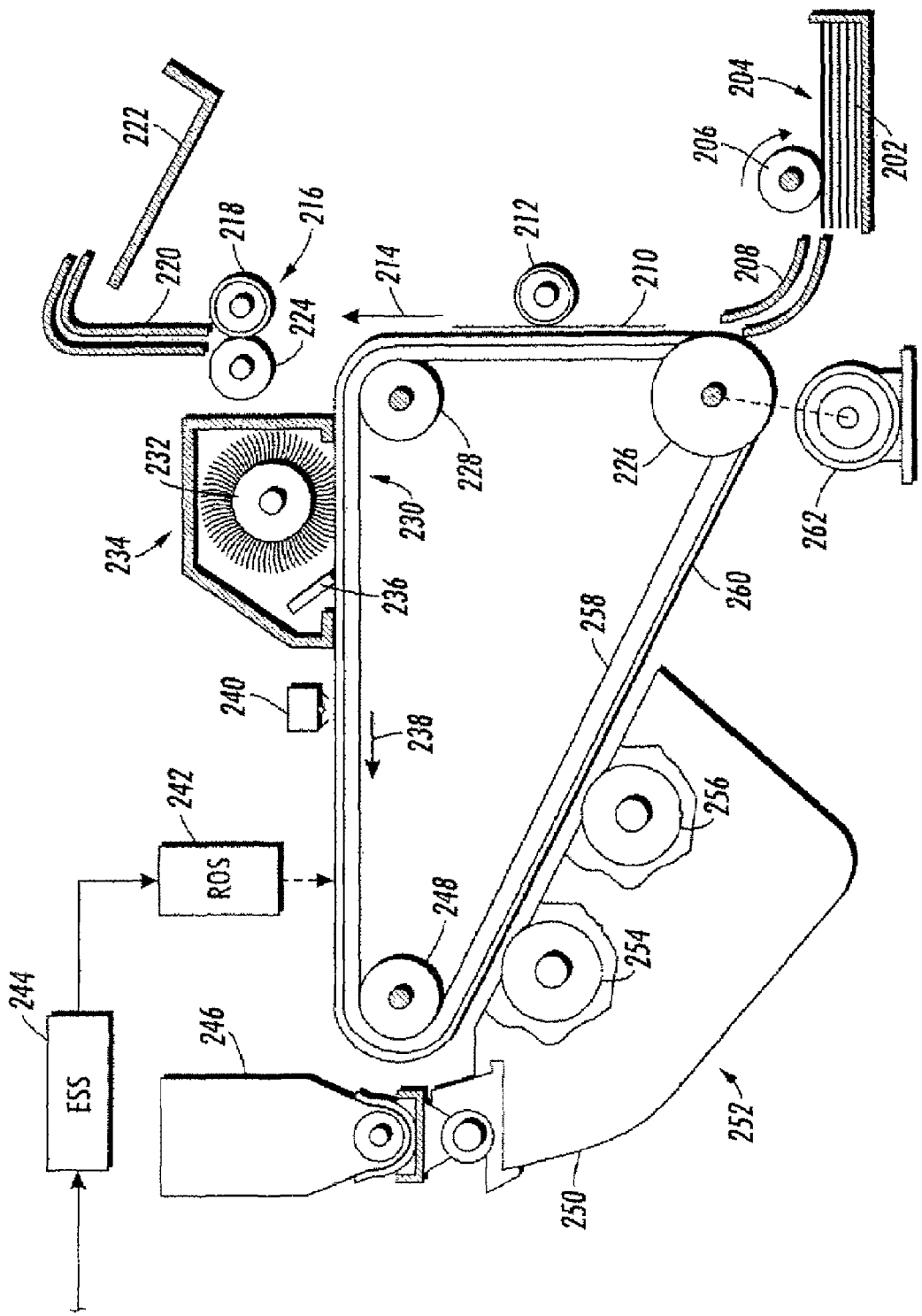
FIG. 1 is a schematic elevational view of an electrophotographic printing engine.

Before the present methods, systems and materials are described, it is to be understood that this disclosure is not limited to the particular systems, methodologies or protocols described, as these may vary. It is also to be understood that the terminology used herein is for the purpose of describing particular embodiments only, and is not intended to limit the scope of the present disclosure which will be limited only by the appended claims. It must be noted that as used herein and in the appended claims, the singular forms "a," "an," and "the" include the plural reference unless the context clearly dictates otherwise. In addition, the word "comprising" as used herein means "including, but not limited to". Unless defined otherwise, all technical and scientific terms used herein have the same meanings as commonly understood by one of ordinary skill in the art.

While the term "user" will be used in the disclosure below, "user" will include reference to any person or persons, such as office managers, office employees, solo business owners, users, home owners, and the like, all of which may be used interchangeably and is to represent any individual who operates a device. The use of the term "print device", "marking device", "printing machine", "print engine" and "printing equipment" will be used interchangeably and is to encompass any electromechanical device or system capable of image reproduction, which may include, but is not limited to printers, scanners, fax machines, multifunctional devices and the like. "Document production" describes, for example, printed documents/papers, scanned documents/papers, faxed documents/papers, and the like.

The term "image content" may be taken to indicate any graphic or text content on a document. For example, analyzing the image content of a print document is meant to indicate that the analyzing involves parameters indicative of the amount and type of toner used on the document, such as whether the document contains text only, solid areas on the leading edge, full pages of solid areas, halftone areas around the text, black only text or images, multiple or single colors, certain color percentages, color layout, textures occurring in the images and the like will be evaluated. Reflectance measurements and the images created from them may provide an accurate representation of the shape, size, color, and overall visual appearance of a print job. This is referred to as the "spatial content" of an image. Thus, the susceptibility of images in a print job to particular defects may be evaluated based on the spatial content or spatial orientation of various aspects of the image content. For specific defects of interest to this disclosure, such as ghosting, reload, and/or halftone depletions surrounding text, the spatial image content may be analyzed to determine susceptibility to defect occurrence.

The term "ghosting," may be taken to indicate a faint, unwanted image on a printed sheet. The term "reload defect" may be taken to indicate a print defect that occurs when localized high toner consumption depletes the available toner in one part of the donor roll surface, and the system may be unable to replenish the depleted toner in one revolution of the roll. This may lead to a repetitive, periodic, gradually declining "ghost" image disturbance propagating in the process direction behind the area of high consumption. "Low area coverage" may be taken to indicate that a print job contains a total area coverage for one of the toner or ink color separations, including text or images, of 5% or less. "Color separation" refers to a single toner or ink color in a multi-color print engine, (e.g., cyan, magenta, yellow or black).

The term "print job" may be taken to mean a file or document or set of multiple files or documents that have been submitted to be printed on a printing machine. These may be submitted remotely by a user from a computer terminal or manually by the user while standing at the print engine. The print jobs are typically identified by a unique number or identification code, and are assigned to a particular destination, usually a print queue for a specific printer. Print jobs may contain further information associated with the media size, the number of copies, the priority for printing, and the printing quality requested by the user.

The term "print queue" may be taken to refer to disk space or a computer memory location that holds print jobs designated for the printer until the printer can receive them. The term "print queue" may also be taken to indicate disk space or a computer memory location that holds print jobs which is part of the printer. As such, a print job received at the printer may be stored in the local print queue, memory or disk space on the printer, or may be immediately printed.

The present disclosure outlines the automatic use of the print job image content information by the print engine itself to adjust the general printing procedure for the engine. The print job's image content information is analyzed in the context of the constraints of the specific print engine to determine an improved printing procedure for that particular print job. In some embodiments, adjusting the printing procedure may reduce the overall run cost per-page for the print job or group of print jobs based on the required image content.

Maintenance and other necessary print engine operations are partly intended to prevent long-term repair issues that would cause failure of components. Thus, the operations are partly intended to help reduce long-term job run costs. Some or all maintenance functions (i.e., cleaning a charge device or lubrication of the cleaning blade) may be performed with less frequent interruption of the user's job stream, and thus with fewer wasted cycles. As such, the overall run cost per-page for the print job may be reduced. An embodiment of the disclosure is a method to monitor image content and adjust the interval or frequency of process control sampling and maintenance cycles correspondingly. In some embodiments, the methods described herein may reduce the run cost per page for a printing engine.

Operations that may be adjusted based on image content analysis may be better understood in light of the following discussion and with reference to FIG. 1, which is a schematic illustration of an exemplary electrophotographic printing machine. Although the electrophotographic process and a specific device is illustrated and used as the basis for the following discussion, other processes and devices are envisioned, such as laser printers, LED printers, dye sublimation printers, ink jet printers, phase change or solid ink printers or thermal printers. Specifically, this method may be used for any number of various printing processes and engines for which the printing procedure has an impact on the run cost per page.

The printing machine illustrated in FIG. 1 generally employs a belt 230 having a photoconductive surface 260 deposited on a conductive ground layer 258. The photoconductive surface 260 may be made from a photoresponsive material, for example, one comprising a charge generation layer and a transport layer. The conductive layer 258 may be made from a thin metal layer or metallized polymer film which is electrically grounded. The belt 230 moves in the direction of arrow 238 to advance successive portions of the photoconductive surface 260 sequentially through the various processing stations along the path of movement, which is counterclockwise in this figure. The belt 230 is wrapped about stripping roller 228, tensioning roller 248 and drive roller 226. The drive roller 226 is mounted with the belt 230 in such a manner as to allow free rotation. The motor 262 rotates the roller 226 to advance the belt 260 in the counterclockwise direction of arrow 238.

Initially, a portion of the belt 230 passes through a charging station, as represented by a corona generating device 240, which charges the photoconductive surface 260 to a relatively high, substantially uniform potential. After photoconductive surface 260 of belt 230 is charged, the charged portion is advanced to an exposure station.

At the exposure station, a controller or electronic subsystem (ESS), 244, receives the image signals representing the desired output image and processes these signals to convert them to a continuous tone or grayscale rendition of the image which is transmitted to a modulated output generator, for example the raster output scanner (ROS), 242. This is the procedure for a black and white image or text document, but may also apply with certain changes to the reproduction of color documents. Preferably, the ESS 244 is a self-contained, dedicated minicomputer. The image signals transmitted to ESS 244 may originate from a computer, thereby enabling the electrophotographic printing machine to serve as a remotely located printer for one or more computers. The printer may also serve as a dedicated printer for a high-speed computer. Alternatively, the image signals may originate from any other image capture device, such as, for example, a scanner.

The signals from ESS 244, corresponding to the continuous tone image desired to be reproduced by the printing machine, are transmitted to ROS 242. ROS 242 includes a laser with rotating polygon mirror blocks. The ROS illuminates the charged portion of photoconductive belt 230, thus exposing the photoconductive belt to record an electrostatic latent image thereon corresponding to the continuous tone image received from ESS 244. As an alternative, ROS 242 may employ a linear array of light emitting diodes arranged to illuminate the charged portion of photoconductive belt 230 on a raster-by-raster basis.

Alternatively, the ESS 244 may be connected to a raster input scanner (RIS). The RIS has an original document positioned thereon. The RIS has document illumination lamps, optics, a scanning drive, and photosensing elements, such as an array of charge-coupled devices. The RIS captures the entire image from the original document and converts it to a series of raster scan-lines which are transmitted as electrical signals to ESS 244. The ESS 244 processes the signals received from the RIS and converts them to grayscale image intensity signals which are then transmitted to ROS 242. ROS 242 exposes the charged portion of the photoconductive belt to record an electrostatic latent image thereon corresponding to the grayscale image signals received from ESS 244.

After the electrostatic latent image has been recorded on the photoconductive surface 260, the belt 230 advances the latent image to a development station where toner, in the form of liquid or dry particles, is electrostatically attracted to the latent image using commonly known techniques. As shown, at the development station, a magnetic brush development system, 252, advances developer material into contact with the latent image. The magnetic brush development system 252 includes two magnetic brush developer rollers 254 and 256. These rollers advance the developer material into contact with the latent image. These developer rollers form a brush of carrier granules and toner particles extending outwardly therefrom. The latent image attracts toner particles from the carrier granules forming a toner powder image thereon. As successive electrostatic latent images are developed, toner particles are depleted from the developer material. A toner particle dispenser, 246, dispenses toner particles into developer housing 250 of developer unit 252.

After the electrostatic latent image is developed, the toner powder image present on the belt 230 advances to a transfer station. A print sheet 210 is advanced to the transfer station by a sheet feeding apparatus, 204. The sheet feeding apparatus 204 includes a feed-roll 206 which rotates to advance the uppermost sheet from stack 202 into the chute 208. The chute 208 directs the advancing sheet of support material (i.e. paper) into contact with the photoconductive surface 260 of belt 230 in a timed sequence so that the toner powder image formed thereon contacts the advancing sheet at the transfer station. The transfer station may include a corona generating device (not shown) which sprays ions onto the back side of sheet 210, which attracts the toner powder image from photoconductive surface 260 to sheet 210. The transfer station may alternately include a contact charging device, such as a biased charging roll (212), which transfers the developed toner image from the image bearing photoconductive surface to the paper or substrate through direct contact. In either case the paper 210 continues to move in the direction of arrow 214 onto a conveyor which advances the sheet to a fusing station.

The fusing station includes a fuser assembly, 216, which permanently affixes the transferred powder image to the sheet 210. The fuser assembly 216 includes a heated fuser roller 224 and a back-up roller 218. The sheet 210 passes between the fuser roller 224 and the back-up roller 218 with the toner powder image contacting the fuser roller 224. In this manner, the toner powder image is permanently affixed to sheet 210. After fusing, sheet 210 advances through the chute 220 to a catch tray 222 for subsequent removal from the printing machine by the user.

After the print sheet is separated from the photoconductive surface 260 of belt 230, the residual toner/developer and paper fiber particles adhering to photoconductive surface 260 are removed at a cleaning station. The cleaning station 234 includes a fibrous brush 232 which is in contact with the photoconductive surface 260 to disturb and remove paper fibers. The cleaning station 234 also includes a cleaning blade 236 to remove the non-transferred toner particles.

Figure 2:
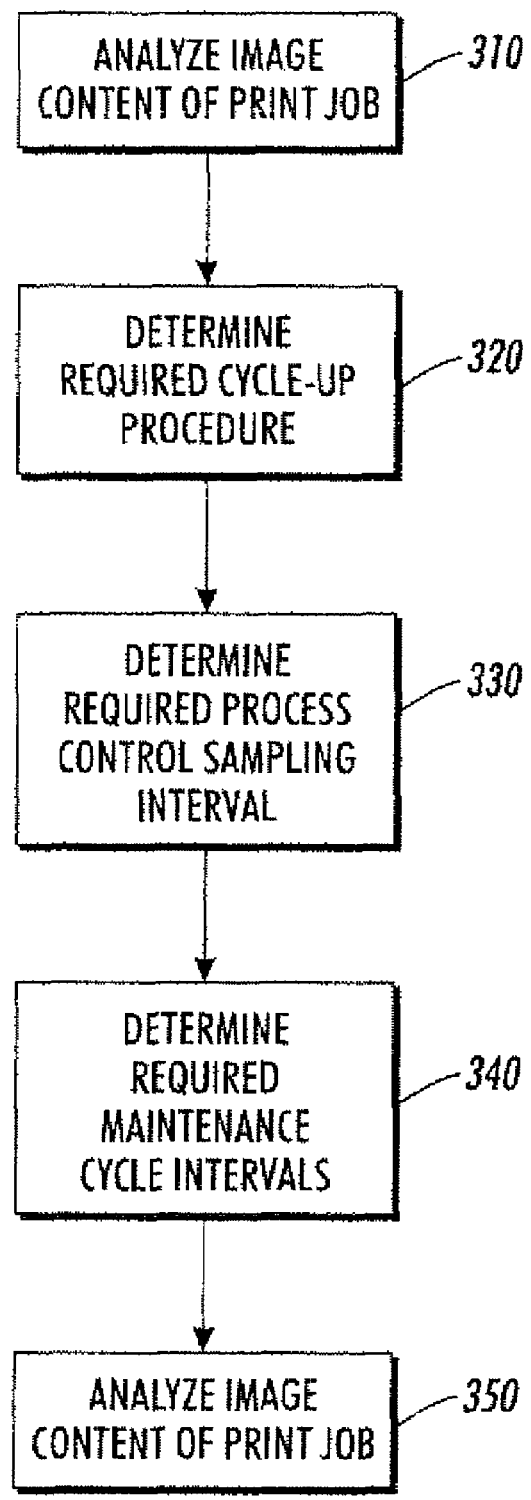
FIG. 2 is a flow chart illustrating the information flow for analyzing and implementing a print strategy.

A flowchart for an embodiment of the present disclosure is presented in FIG. 2. The image content for a user print job is analyzed (310). This image content may be collected by the electronic subsystem of the printer, illustrated as the ESS 244 of FIG. 1, or by another appropriate device. The analysis of the image content allows the print engine to determine (320) a correct or efficient cycle-up procedure. This information may also allow the print engine to determine a process control sampling interval (330) and a maintenance cycle interval (340). The interval determination may occur on a case-by-case basis or it may include adjustment of the interval from a predetermined baseline, such as 80 pages. Once the print engine has started the print job, it may then analyze the next print job (350). The information gathered from this second print job may be used to alter the intervals (330, 340 and 350) accordingly. Some or all of the steps outlined in this flowchart may be performed prior to the machine starting to print a user print job. The procedure enables the adjustment of the printer's printing procedure—including the cycle-up procedure, the process control sampling interval, and the scheduling of the maintenance cycles—based on the image content of the print job.

In yet another embodiment, the method of operating a print engine may further comprise analyzing results of a process control cycle and adjusting print engine actuators to maintain consistent print job quality. This may allow for an analysis of the performance of a process control cycle, such that, if the analysis indicates poor print engine performance, the interval of sampling and the print engine actuators may be adjusted. If, on the other hand the analysis indicates excellent print engine performance, the interval of sampling by process control cycles may be increased in an effort to reduce toner or ink waste, as well as to improve the overall efficiency of the print engine.

The image content information for the print job may be obtained through a variety of methods, including scanning of a document on the platen of a copying device or transmission of digital information from a separate computer. The analysis of the print job's image content information may be undertaken in the ESS shown in FIG. 1 (244). Hardware (e.g. gate arrays) or software in this module may pre-process the input job stream to determine an improved printing procedure for the print engine to utilize in creating this document, or set of documents. This image analysis procedure may look for things like: no required content for one of the color primaries or separations (e.g., cyan, magenta, yellow or black) on a page-by-page basis, less than 10% area coverage for a given color separation, the presence of large area mid-level halftone regions, and regions of susceptibility to reload or ghosting defects based on spatial orientation of the image content (i.e. presence of source and destination objects in appropriate locations in the images).

Using this type of approach, it would also be possible to make use of the information about one or more of the jobs in a current job queue to determine a printing procedure and especially the cycles for printer maintenance functions for the engine. As an example, consider the case of an engine's print queue containing two print jobs: one fairly long job of lower required fidelity (e.g.—low grade business graphics and text), followed by a higher required fidelity job (e.g.—pictorials).

Under prior art operation, the printer would use the same printing procedure to print both jobs. However, by making use of the image content information about both jobs in the print queue, the process control cycles and/or the maintenance cycles for the print engine may be executed more or less frequently, as appropriate, during the printing of the first, lower required fidelity print job. Near the end of this first job, the engine could resume its nominal procedure to prepare for the higher fidelity requirements of the second print job. Thus, in addition to using image content information for a single print job, in some embodiments the print engine may improve its overall efficiency and run cost performance based on the image content information of multiple jobs in the print queue.

Figure 3:
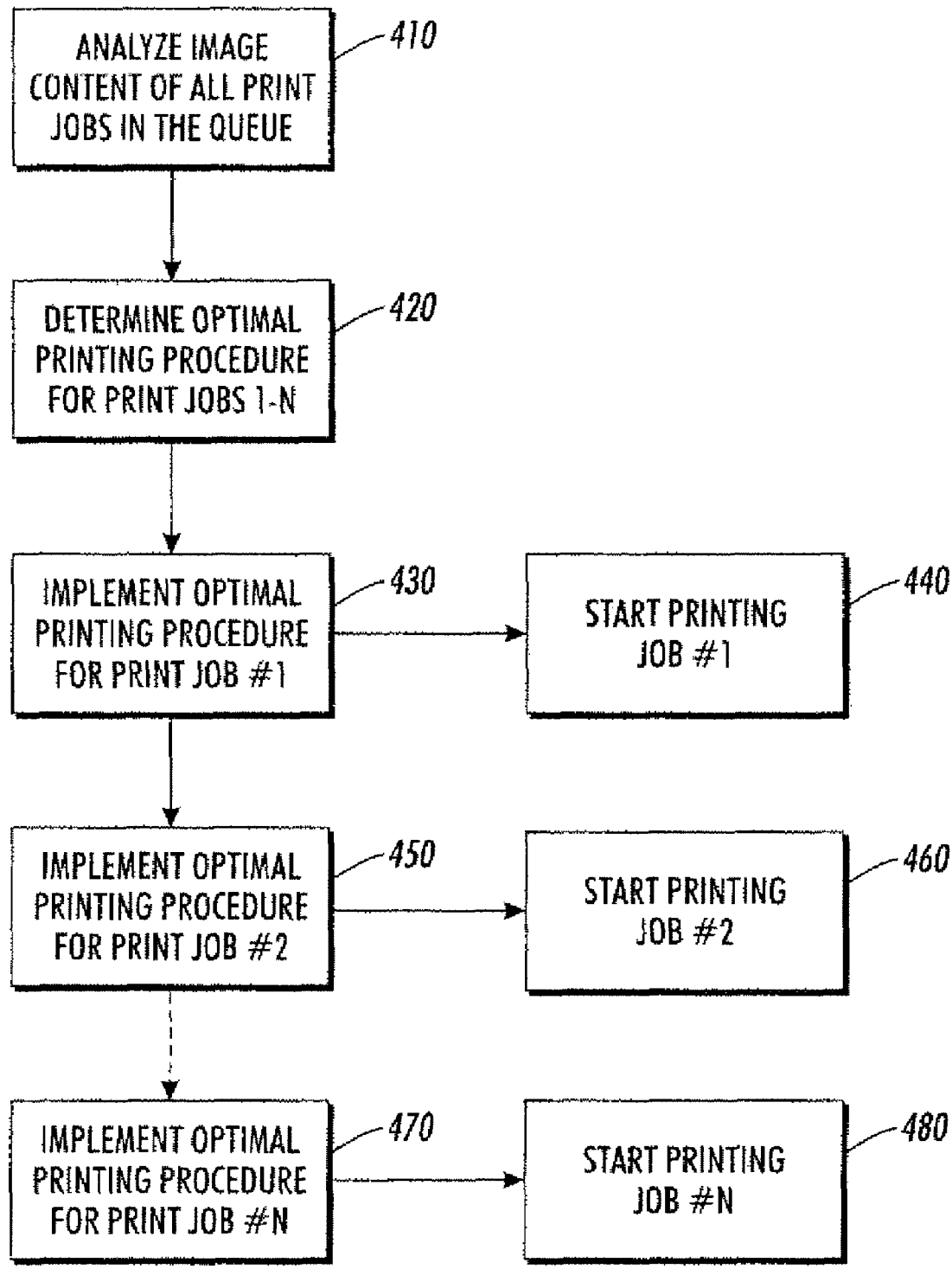
FIG. 3 is a flow chart illustrating the information flow for analyzing and implementing a print strategy for a multi-print job.

FIG. 3 illustrates an embodiment of the current disclosure for a print engine that may contain multiple print jobs within the print queue. Information about all the print jobs within the print queue is analyzed (410). An appropriate printing procedure is determined for the collection of jobs (420). A procedure for the first print job is implemented (430), and the first print job is printed (440) using that procedure. In a similar manner, a procedure for the second print job is implemented (450), and the second print job is printed (460) using that procedure. This type of analysis is carried out for all the print jobs within the queue. As such, a procedure for the $N^{th}$ print job is implemented (470), and the $N^{th}$ print job is printed (480) using that procedure.

During a printing process, there are many steps at which the print job image content may have an impact on print engine efficiency. For example, the impact of wasted print cycles, an their associated run cost implications, is seen by considering the wearing away of the surface of the photoconductor 260 due to interaction with a contact charging device in a print engine. Exposure of the photoconductor 260 surface to an alternating current, contacting biased charging roll (BCR) may accelerate the degradation of the surface of the photoconductor. With reference to FIG. 1, the BCR 212 is a roller that enables transfer of the developed toner image from the image bearing photoconductive surface 260 to the paper or substrate through direct contact. Thus, the more cycles the photoconductor makes while exposed to the activated (i.e. biased) BCR device, the more the surface of the photoconductor will be worn. The rate at which the surface of the photoconductor device wears will in turn determine its useful life, as this device typically requires a replacement after a certain amount of material has been lost from its surface. Because of this, the overall run cost performance of the print engine will be influenced by the number of wasted cycles in which the photoconductor 260 is exposed to an active BCR. By limiting the number of wasted cycles experienced by the photoconductor 260, it may be possible to improve the photoconductor's run cost performance.

Another example of the impact of wasted print cycles and their associated run costs may be found in print engines that provide black as well as color prints. In this instance, if a user requests an image with no color information contained therein, there may be no need to operate the color developer housings which could lead to an unnecessary degradation of the color developer materials as a result of minimal throughput operation. In addition, there may be no need to run maintenance cycles or process control cycles which are specific to color reproduction, thus saving time and wear on the print engine parts and toner materials which would otherwise typically be used to print test patches during the process control routines.

As a further example of the type of strategy proposed by the present disclosure, consider the case for reducing the frequency of the process control cycles. A process control cycle represents a procedure which may be undertaken by the print engine in an effort to maintain consistent output printing behavior. These cycles may occur at regular intervals in most print engines. During such a routine, the print engine may print sample test patterns and make measurements with in-situ sensing devices in situ to the printer. These measurements may be used to make adjustments to the internal actuators of the printer in an attempt to maintain stable operation of the engine. In most printers, the process control cycles may make use of toner material to print the test patches as well as cycles of the print engine to print the patches and make the required measurements. The toner material used and the cycles taken may be viewed as wasted from the user's perspective since neither is used to directly generate output prints. Thus, adjusting the interval at which the process control cycles occur may impact the amount of "waste", and therefore the run cost, for a print engine.

As a further example of the type of strategy proposed by the present disclosure, consider the case for reducing the frequency at which a maintenance event may occur in the printer. A maintenance event may include actions such as performing a cleaning cycle for the photoreceptor, the raster output scanner, or the charging device. These types of actions may require dead-cycles of the print engine, cycles in which no output prints are generated, in order to perform them. Once again, from the user perspective these maintenance cycles are "wasted" cycles since they are not actually used to directly produce output prints. By making use of image content information to determine when these cycles are likely to benefit the stability of the output prints, and thereby reducing their occurrence as much as possible without impacting the output prints in a significant way, it may be possible to affect the efficiency and therefore run cost performance of the print engine.

In a standard print engine setup for an example printer, a process control cycle of about 3-4 pages in length may occur at a minimum frequency of every 80 pages during a normal print run. This process control cycle may occur more often if environmental factors or the machine's current state information dictate that it may be necessary. For a nominal run situation in this example print engine, the process control cycle procedure equates to 4-5% of the run-time of the engine being spent printing process control cycles. During the process control cycles, the photoconductor 260 is exposed to an active BCR device (212 in FIG. 1). Thus, the surface of the photoconductor 260 will be worn away during these process control cycles, as discussed before. Since the process control cycles can, from a run cost perspective, be considered wasted cycles, reducing the frequency of occurrence of these cycles may increase the number of user prints obtainable during the useful life of the photoconductor as well as those of other replaceable components in the print engine. Such a change in cyclic efficiency of the print engine may have an impact on the run cost per-page for the print engine.

Decreasing the sampling interval for the process controls may result in more drift in the process outputs between control samples. However, for certain user jobs whose image content would not be as susceptible to such process drifts, a decreased sampling interval may be allowable. A print job including mostly black text or graphics with very little color content would be one example of such a print job. Other image content could provide further opportunities for extending the process control sampling interval where slight variations in the process would be acceptable to users, such as, for example, certain types of business graphics which may be less susceptible to slight color shifts between process control updates. While printing such documents the engine could reduce the frequency of the process control cycles, or potentially even eliminate the color calibration patches used during the process control sampling interval to further reduce the number of wasted cycles and wasted toner material during the print job. Thus, using the image content information for the specific user job being printed, it may be possible to adjust the frequency of the process control cycles to improve the cyclic efficiency of the engine, optionally thereby also improving the run cost per-page for the current print job. For these types of adjustments to the sampling interval of the process controls, the parameters for process control algorithms may be adjusted such as through the use of a look-up table or other mechanism to provide controller parameters for a set of optional sampling intervals.

In a similar fashion, image content information about a specific user job currently being printed may be used to adjust the required actions during the cycle-tip procedure or before the scheduled occurrence of the next maintenance cycle. For example, for certain types of user jobs, the machine may need to run a process control cycle to stabilize the engine before starting to print after a cycle-up. However, for mostly black text or business graphics print jobs, the print engine may not need to run a process control cycle after a cycle-up to provide acceptable output prints.

A further example where image content may have an impact on printing may be found in print jobs which have low area coverage of image or text or all absence of large area mid-level halftones, as mentioned above. Printing long runs of low area coverage pages can lead to material abuse and other problems which in turn lead to problems in development and/or transfer performance. Additionally, such print jobs may lead to print defects such as streaks which arise due to improper or poor lubrication of the cleaning blade 236. If a long run of low area coverage pages is to be printed, the residual toner on the photoconductive surface 260 may not provide enough lubricant for the cleaning blade 236, resulting in increased friction and eventually to nicks or cuts along the edge of the blade which contact the photoconductive surface. The end result may be degradation in the output image quality as the low area coverage job progresses. Further, the toner housed in the developer housing 250 may spend an excessive amount of time in the housing, thereby being exposed to the mechanical and/or electrical abuse in the developer housing for an extended period of time. This leads to aging of the toner and developer particles without actual use on a printed page, and may cause streaking or incorrect color tone when finally applied to a printed page. To combat this problem, prior systems have interrupted print jobs based on the toner usage levels to run waste patterns for a period of time to effectively purge the developer housing and reset the material state back to a better condition. This can be considered as a form of maintenance cycle and the occurrence of such events can have an affect on system run cost.

It is possible that the user job could contain a long period of low area coverage printing followed by nominal or high area coverage sets of pages. Without accounting for the actual image content of the user's print job, the machine could be forced into a maintenance cycle of printing waste patterns only a short time before a set of high area coverage pages would have come through in the user's job anyway. In addition, it is also possible that the image content would be such that an extended portion of low area coverage printing would be deemed acceptable. In other words, the user image content could be such that minor degradations in print quality would not warrant a maintenance cycle. As an example, a section of the print job consisting of mostly black text would not required high fidelity from the color developer housings. Such an extension in the time period between maintenance cycles would be of limited length as these cycles could not be prolonged indefinitely. However, by extending the length of time between required maintenance cycles based on the actual image content of the user's print job, it may be possible to improve the overall efficiency of the print engines thereby lowering the overall run cost per-page for the print job. An embodiment of the current disclosure, therefore, makes it possible to determine whether a user job may contain a long period of low area coverage pages followed by a nominal or high area coverage set of pages. The embodiment may further ascertain the level of fidelity of print quality required for each print job encountered, and it may adjust the cycles of one or more maintenance functions accordingly.

To further illustrate the methods provided in this disclosure, a small number of non-limiting examples of actions are provided in the table below. These actions, which are for the implementation cycles, may be adjusted during the cycle up procedure based on the image content of a print job or set of print jobs.

| Image content | Change to the normal procedure |
| --- | --- |
| No color content in the print job (black only) | Increase interval for process control loops for color separations |
| Maximum total color content for any of the color separations <10% | Increase interval for process control loops for color separations |
| Maximum total color content for a single color separation <10% | Increase interval for process control loops for single color separation |
| No pictorial regions in the document, only "business graphics" or text | Increase interval for process control loops for all color separations |
| Repeated appearance of a specific color | Nominal process control intervals for color separations required to produce specific color |
| Low area coverage (<10%)/text only | Increase frequency of printing lubrication stripes for cleaning blades |
| No large halftone areas in the Mid-tone region for a specific color separation | Increase interval for cleaning the charging device for the specific color separation during print job |
| Low pictorial and/or color content for next print job | Set printing procedure for a low fidelity cycle up: Do not perform process control cycle during the cycle-up procedure |
| High pictorial and/or color content for next print job | Set printing procedure for a high fidelity cycle up: Perform process control cycle during the cycle-up procedure |

In the past, the run cost implications of the printing procedure have typically not been considered in an active sense. In other words, the printing procedure was, for the most part, fixed at design-time and did not change at run-time based on the specific job/image content of each user print job. For example, a maintenance cycle may have been set to run for every 80 pages printed, or whenever the cover to a print machine was opened by a user, resulting in a change in the environmental conditions. The proposed adjustments of the printing procedure of the present disclosure may include adjustment of any of the required print engine activities for making a print. Adjustments of such operations may be performed for each print job. In addition, the frequency of occurrence of adjustment of a job may be modified based on image content.

Figure 4:
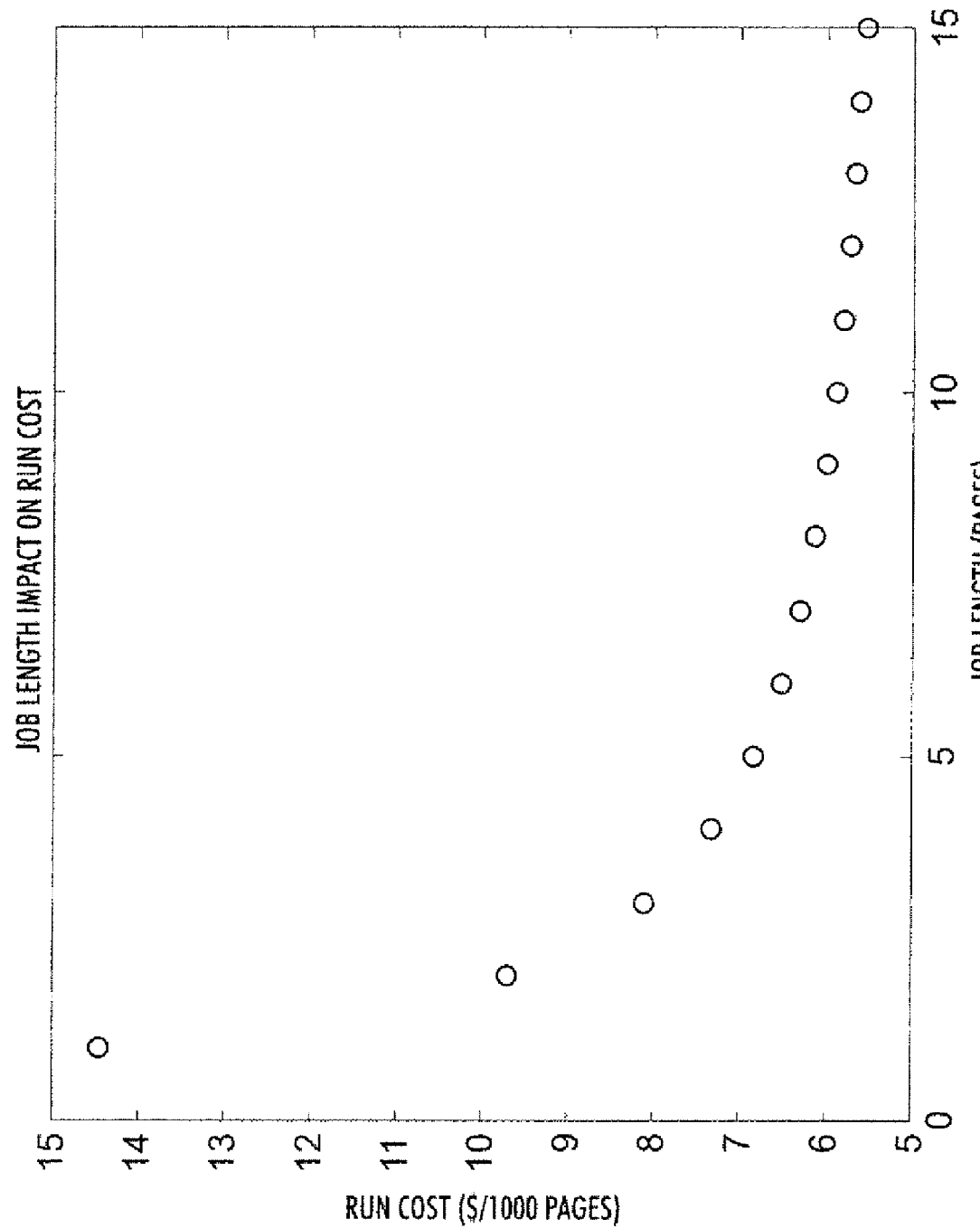
FIG. 4 illustrates an impact of job length on an exemplary print engine run cost on a per page basis.

An analysis of an exemplary printer's estimated run cost performance as a function of the average length of the user's print jobs is shown in FIG. 4. This figure illustrates that the run cost per-page for this print engine increases very rapidly as the average length of the user print jobs decreases. The reason for this is that the costs associated with the wasted engine cycles during the cycle-up and cycle-down procedures are amortized over fewer pages for the shorter print jobs. As the plot illustrates, this drives up the cost per-page substantially for these short jobs. This is an example of how the frequency of the occurrence of wasted cycles can have a significant impact on the run cost per-page for a print engine. In other words, the more output prints that are made per wasted cycle, the lower the average run cost per-page may be for the system. Thus, controlling the printing procedure, the scheduling of the required maintenance and other wasted cycles, can play a role in determining the overall run cost per-page for a print engine.

It will be appreciated that several of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A method of operating a print engine, comprising:
   receiving a print job in a print queue;
   analyzing image content of the print job, wherein analyzing the image content comprises identifying maximum size of mid-level halftone blocks for each color separation, susceptibility to halftone depletion surrounding text, susceptibility to reload defects, or susceptibility to ghosting;
   determining a printing procedure for a print engine based on the image content;
   printing, via the print engine, the print job using the determined printing procedure;
   using the image content to determine a maintenance cycle interval for the print engine;
   adjusting a frequency of a maintenance cycle for the print engine based on the determined maintenance cycle interval; and
   performing a maintenance event in the print engine according to the adjusted maintenance cycle.

2. The method according to claim 1, further comprising:
   receiving a second print job in the print queue;
   analyzing image content of the second print job, wherein analyzing the image content of the second print job comprises identifying maximum size of mid-level halftone blocks for each color separation, susceptibility to halftone depletion surrounding text, susceptibility to reload defects, or susceptibility to ghosting;
   determining a modified printing procedure for the print engine based on the combined image content of the first and second print jobs; and
   printing, via the print engine, the second print job based on the modified printing procedure;
   wherein the adjusting a frequency of a maintenance cycle is also based on the combined image content.

3. The method according to claim 2, wherein the second print job may be received in the print queue while the first print job is also in the print queue or being printed.

4. The method according to claim 1, further comprising:
   identifying a process control cycle;
   determining an adjusted frequency for the process control cycle based on the image content; and
   adjusting at least one print engine actuator to perform the process control cycle according to the adjusted frequency.

5. The method according to claim 4, wherein determining a printing procedure for the print engine also comprises determining a cycle-up procedure.

6. The method according to claim 1, wherein the print job comprises multiple documents.

7. The method according to claim 1, wherein the image content comprises an amount and type of toner used, and the determining a printing procedure also comprises determining the printing procedure based on the amount and type of toner used.

8. The method according to claim 1, wherein analyzing the image content also comprises determining overall color content, mean area coverage for each color separation, or maximum area coverage for each color separation for a page of the print job.

9. The method according to claim 1, wherein:
   adjusting the frequency of a maintenance cycle comprises decreasing frequency of a color calibration cycle interval if overall color content of the print job is below a threshold value; and
   performing the maintenance event comprises performing the color calibration cycle according to the adjusted maintenance cycle frequency.

10. The method according to claim 1, wherein:
    adjusting the frequency of a maintenance cycle comprises increasing a cleaning cycle interval for a charging device of the print engine if mid-level halftone content of the print job is below a threshold value; and
    performing the maintenance event comprises performing the cleaning cycle for the charging device according to the adjusted maintenance cycle frequency.

11. The method according to claim 1, wherein:
    adjusting the frequency of a maintenance cycle comprises decreasing a lubrication cycle interval for a cleaning device of the print engine, wherein lubrication stripes are printed to provide toner lubrication to a cleaning blade, if the overall mean area coverage of the print job is below a threshold value; and
    performing the maintenance event comprises performing the lubrication cycle for the cleaning device according to the adjusted maintenance cycle frequency.

12. The method according to claim 1, wherein determining the printing procedure also comprises determining a desired cycle-up procedure, and determining the desired cycle-up procedure comprises not performing a process control cycle during cycle-up of the print engine if mean area coverage per page for all color separations of the print job is below a threshold value.

13. The method according to claim 1, wherein determining the printing procedure also comprises determining a desired cycle-up procedure, and determining the desired cycle-up procedure comprises not performing a process control cycle during cycle-up of the print engine if a total length of the print job is below a threshold value.

14. The method according to claim 1, wherein determining the printing procedure also comprises determining a desired cycle-up procedure, and determining the desired cycle-up procedure comprises not performing a process control cycle during cycle-up of the print engine if a largest block of mid-level halftone region for all color separations of the print job is below a threshold value.

15. The method according to claim 1, wherein determining the printing procedure comprises determining a process control cycle interval, and determining the process control cycle interval comprises increasing an interval for measurement of test patches and adjustment of an exposure device of a color separation of the print engine if total area coverage for the color separation of the print job is below a threshold value.

16. The method of claim 1, wherein determining the printing procedure for the print engine based on the image content reduces overall run cost per page, number of wasted cycles, frequency of process control cycles or amount of toner or ink used, or improves overall efficiency of the print engine.

17. A method of operating a print engine, comprising:
receiving a first print job in a print queue;
analyzing image content comprising data selected from the group consisting of regions of susceptibility to ghosting or reload defect, and maximum size of mid-level halftone blocks for each color separation;
determining a printing procedure for a print engine based on the image content of the first print job in the print queue;
receiving a second print job in the print queue;
analyzing image content comprising data selected from the group consisting of regions of susceptibility to ghosting or reload defect, and maximum size of mid-level halftone blocks for each color separation;
modifying the printing procedure for the print engine based on the image content of the second print job;
printing, via the print engine, the first and second print jobs using the modified printing procedure;
adjusting a frequency of a maintenance cycle for the print engine based on the image content of the first and second print jobs; and
performing a maintenance event in the print engine based on the adjusted maintenance cycle.

18. The method according to claim 17, wherein determining the printing procedure for the print engine comprises determining a process control sampling interval.

19. The method of claim 17, wherein determining the printing procedure for the print engine comprises determining a cycle-up procedure.

20. A method of operating a print engine, comprising:
receiving a first print job in a print queue;
analyzing image content for the first print job by identifying maximum size of mid-level halftone blocks for each color separation, susceptibility to halftone depletion surrounding text, susceptibility to reload defects, or susceptibility to ghosting in the first print job;
determining, via a processor, a printing procedure for the print engine based on the image content of the first print job in the print queue, wherein the printing procedure comprises a cycle-up printing procedure or a process control cycle;
receiving a second print job in the print queue;
analyzing image content of the second print job by identifying maximum size of mid-level halftone blocks for each color separation susceptibility to halftone depletion surrounding text, reload defects, or susceptibility to ghosting in the second print job;
modifying the printing procedure for the print engine based on the image content of the second print job;
printing, via the print engine, the first and second print jobs using the modified printing procedure;
determining a maintenance cycle for the print engine based on the image content of the first and second print jobs; and
performing a maintenance event in the print engine based on the maintenance cycle.

* * * * *